Patented Sept. 3, 1940

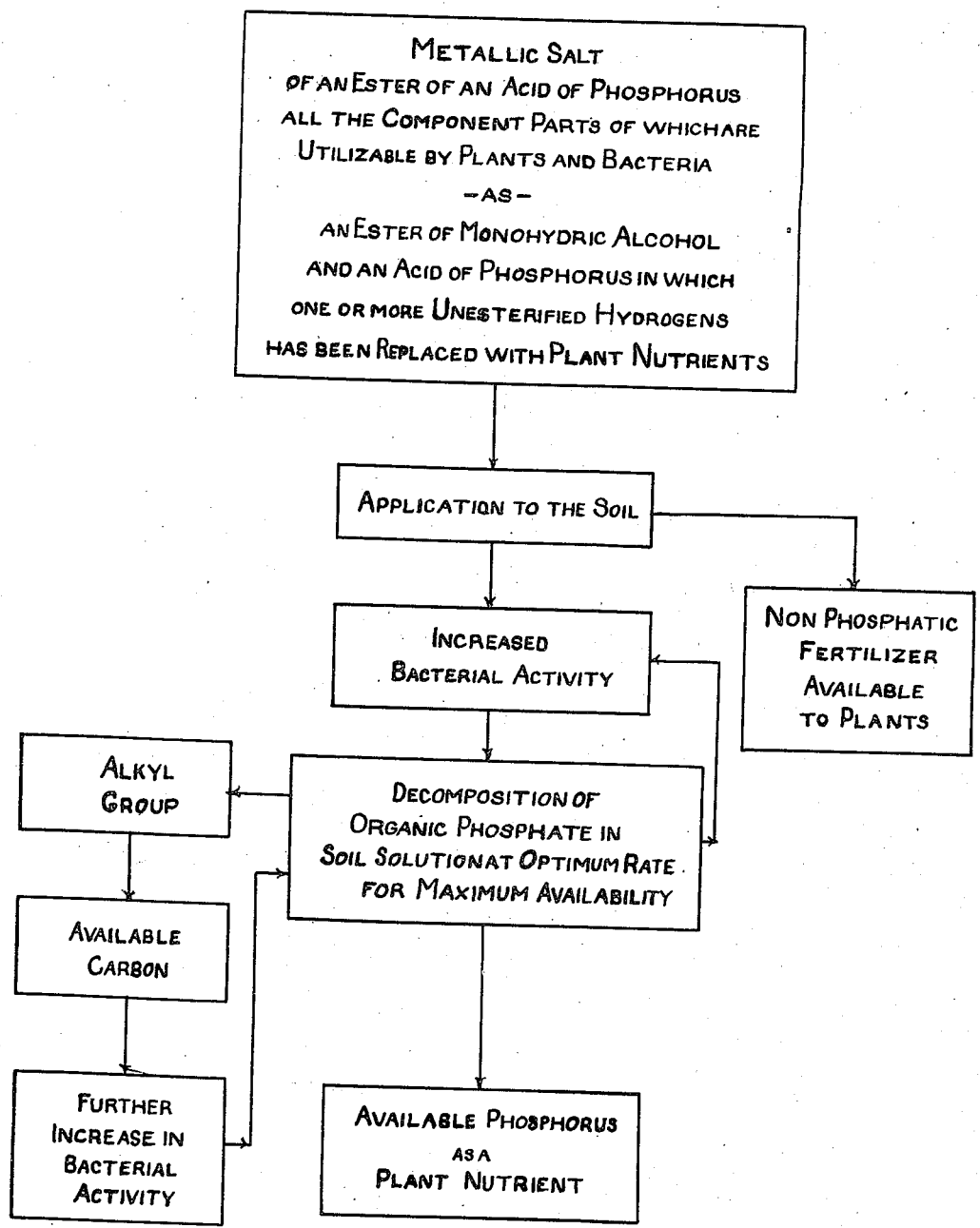

2,213,620

UNITED STATES PATENT OFFICE 2,213,620

ORGANIC PHOSPHATE

Wilder D. Bancroft, James K. Wilson, and John E. Rutzler, Jr., Ithaca, N. Y.

Application August 24, 1938, Serial No. 226,552

4 Claims. (Cl. 71—27)

Our invention relates to a new fertilizer, and more particularly to a fertilizer consisting of mixtures of metallic salts of acid esters of phosphoric acid, each of which is so constructed that all the component parts of the mixture are utilizable by plants and soil bacteria. The present application is a continuation-in-part of our copending application Serial No. 170,289, filed October 21, 1937.

An object of our invention is to provide fertilizer mixtures which may be used to stimulate plants and soil bacteria without leaving a residue of non-utilizable material in the soil.

Another object of our invention is to supply complete fertilizers having less bulk, in proportion to the plant food values they contain, than the fertilizers now in use.

A further object of our invention is to supply organic phosphates to the soil in such a form that bacterial activity will be stimulated and the organic phosphates caused to decompose at the optimum rate consistent with wide distribution and early availability, without at the same time supplying material which is unavailable to the growing plants.

Hitherto, it has been customary to employ such salts as, for example, sodium nitrate, ammonium sulphate, and potassium chloride, as sources of nitrogen and potassium for growing plants. The use of salts of this type has two great disadvantages. In the first place, the sodium in the sodium nitrate, the sulphate radical in the ammonium sulphate, and the chlorine in the potassium chloride are extraneous materials of little value as plant nutrients in the majority of cultivated soils and therefore tend to accumulate and also to change undesirably the acidity of the soil. Secondly, it is obviously uneconomical to apply to the soil a compound, an important fraction of the weight of which consists of non-utilizable material.

Besides these inorganic compounds, certain organic phosphates have also been advocated for use as fertilizer materials. These have usually consisted of compounds such as the methyl, ethyl and propyl esters of phosphoric acid which we have found are not sufficiently high in available phosphorus to meet the requirements of plants during their early growing period unless these materials are forced to decompose more rapidly than they normally would.

The rate of decomposition of these materials can be markedly increased by applying them to the soil in admixture with non-phosphatic fertilizers, and the decomposition of the organic phosphates makes the phosphorus available to the plant during the early stages of its growth. However, such mixtures also have the disadvantage of incorporating into the soil such non-utilizable materials as sodium, chloride and sulphate.

To overcome the above-mentioned difficulties, we have found that fertilizer mixtures which produce excellent increases in plant growth without depositing any material in the soil which is not a plant and bacterial nutrient can be made from organic phosphates which are esters of monohydric alcohols by neutralizing one or more unesterified hydrogens of phosphoric acid with plant nutrients. For instance, by the use of potassium ammonium monoethyl phosphate the plant is supplied with the required potassium, nitrogen and phosphorus. Our invention can be carried out in another way. For example, we may add to the soil a mixture of potassium diethyl phosphate and ammonium diethyl phosphate. Or, if it is desired also to introduce calcium into the soil, we may for example use such a mixture as calcium diethyl phosphate and ammonium potassium monomethyl phosphate. All of these mixtures carry utilizable carbon as well as other elements important in the nutrition of the plant.

At the same time that our new mixtures of fertilizer materials function to increase plant growth, they also function to increase bacterial growth in the vicinity of the organic phosphate. In this way they bring about the decomposition of the organic phosphate at the fastest rate consistent with deep and wide distribution in the soil and rapid availability of the phosphorus to the plant.

The following are examples of mixtures which function to supply all the major nutrients required by plants without introducing extraneous material into the soil. These mixtures are given by way of example only; once the general principle is shown, it will be obvious to those skilled in the art that our invention covers a wide variety of combinations. For example, potassium, nitrogen, calcium, carbon and phosphorus can be incorporated in one mixture in several ways, such as by the use of three dialkyl phosphates to one of which is attached potassium, to another ammonium and to the third calcium. On the other hand, one dialkyl phosphate and one monoalkyl phosphate may be used by attaching the two metallic atoms to the monoalkyl phosphate and the ammonium radical to the dialkyl phosphate, or vice versa.

(1)

| | Pounds |
|---|---|
| Ammonium monomethyl phosphate | 100 |
| Potassium dimethyl phosphate | 50 |

(2)

| | |
|---|---|
| Ammonium monoisopropyl phosphate | 125 |
| Potassium dimethyl phosphate | 50 |
| Calcium diethyl phosphate | 25 |

(3)

| | |
|---|---|
| Ammonium monomethyl phosphate | 125 |
| Potassium diethyl phosphate | 75 |

(4)

| | |
|---|---|
| Ammonium monoethyl phosphate | 75 |
| Potassium dimethyl phosphate | 50 |
| Potassium diisopropyl phosphate | 50 |

By employing mixtures such as these, we are able to avoid introducing or to lessen the amount of extraneous matter, such as chlorides and sulphates, for example, introduced into the soil. At the same time we supply to the soil substances which stimulate bacterial activity, act as plant nutrients and promote increased availability of the organic phosphate. Many such mixtures and a variety of proportions of their ingredients may be employed to accomplish the desired results, as will be evident to those skilled in the art once our invention is disclosed. These mixtures have the added advantage that they have less tendency to change the hydrogen ion concentration of the soil solution than most commercial fertilizer mixtures which contain potassium, phosphorus and nitrogen.

While we have described the preferred forms of our invention, it is obvious that many modifications may be made therein by one skilled in the art, and therefore we wish the concept of our invention to be limited only by the prior art and the scope of the appended claims.

We claim:

1. A new fertilizer, all the component parts of which are utilizable by growing plants and which does not affect the hydrogen ion concentration of the soil when applied to the land, comprising a mixture of ammonium and potassium salts of esters made from a monohydric alcohol and an acid of phosphorus, said alkali metal replacing at least one unesterified hydrogen atom of the acid which forms the ester, and said potassium salt constituting approximately 25 to 40% by weight of the total mixture.

2. A new fertilizer, all the component parts of which are utilizable by growing plants and which does not affect the hydrogen ion concentration of the soil when applied to the land, comprising ammonium monoisopropyl phosphate, potassium dimethyl phosphate and calcium diethyl phosphate, said potassium salt comprising approximately 25% by weight of the total mixture.

3. A new fertilizer, all the component parts of which are utilizable by growing plants and which does not affect the hydrogen ion concentration of the soil when applied to the land, comprising a mixture of ammonium monomethyl phosphate and potassium dimethyl phosphate, said potassium salt comprising approximately 33% by weight of the total mixture.

4. A new fertilizer, all the component parts of which are utilizable by growing plants and which does not affect the hydrogen ion concentration of the soil when applied to the land, comprising ammonium monomethyl phosphate and potassium diethyl phosphate, said potassium salt comprising approximately 37½% by weight of the total mixture.

WILDER D. BANCROFT.
JAMES K. WILSON.
JOHN E. RUTZLER, Jr.